April 15, 1924.   W. EICHENBERGER-GIRARDET   1,490,809

WEEDING HOE

Filed April 6, 1923

Patented Apr. 15, 1924.

1,490,809

UNITED STATES PATENT OFFICE.

WILLIAM EICHENBERGER-GIRARDET, OF CORTAILLOD, SWITZERLAND.

WEEDING HOE.

Application filed April 6, 1923. Serial No. 630,407.

*To all whom it may concern:*

Be it known that I, WILLIAM EICHENBERGER-GIRARDET, a citizen of the Confederation of Switzerland, residing at Cortaillod, (Neuchatel), Switzerland, have invented certain new and useful Improvements in Weeding Hoes, of which the following is a specification.

Weeding hoes are in use for pulling out the weeds growing in gardens, vineyards, etc., and for labouring and loosening the upper part of the soil. In all cases where the blade of the tool exceeds a certain width, it is impossible to make long strokes, inasmuch as the soil gathers in front of the tool and the heavy weight of the soil to be dragged along, handicaps the quick working and tires the workman out.

Object of the present invention is a hoe with several blades, which are fixed in such a way one after the other and in relation to the handle, that the soil which has been dug up, is able to freely escape between the single blades.

It is not the first time that hoes with several blades have been devised. In most cases the object in view is to be able to easily exchange the single blades. The latter, however, are disposed in a single line, so that the gathering-up of soil in front of the tool nevertheless puts a heavy strain on the instrument.

Other hoes in use for special cultivations have the single blades fixed at certain distance one behind the other. These tools, however, are not fit for general use, inasmuch as such a disposition of the blades, which necessitates an alteration of the angle of inclination, renders a deep entering of the tool into the soil impossible because, as soon as the tool is being tilted on one side, not all the blades are put to useful work.

By using the hoe of the present invention, the blades labour an uninterrupted surface. They are fixed, obliquely to the handle, on to a common, staircase-like bent support, so that the soil being dug up, passes between the single blades of the shape of a ploughshare.

The attached drawing represents, by way of example, two forms of execution of the subject of the invention.

Figure 1:
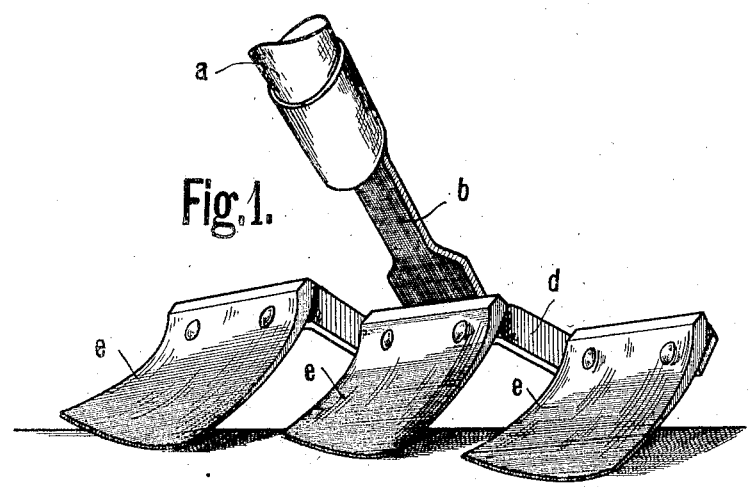
Figure 2:
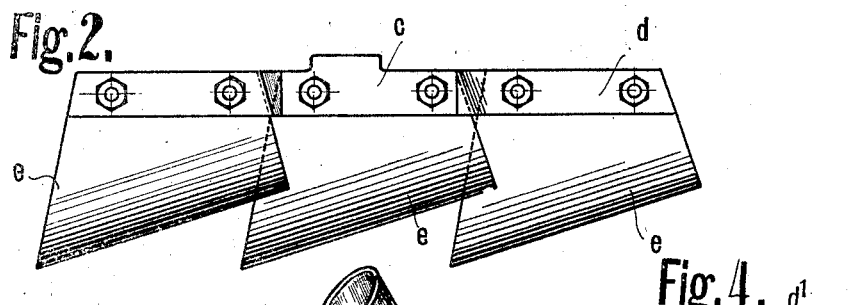
Figures 3, 4:
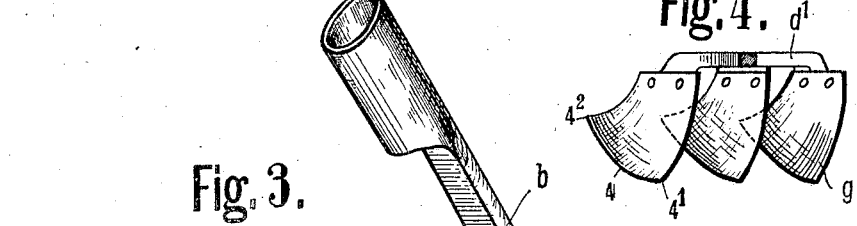

Figures 1 and 2 relate to the first form of execution and the Figures 3 and 4 to the second form of execution.

In the form of execution of Figures 1 and 2, at the end of a handle $a$ is fixed a clamp $b$, which is widened into a bent head-piece $c$. On this head-piece $c$ is fixed the support $d$ and on the latter are fastened the ploughshare-like shaped blades $e$. These are placed somewhat in the form of the outline of a staircase one near the other and partly one behind the other. The blades are of slightly concave form and cut at the lower ends as shown in Fig. 2, so that the moment the tool is placed in ready position to start work, the whole lower edge of the blades comes to lie on the ground and thus an uninterrupted surface is being laboured.

The result of the blades being disposed obliquely to the handle, and partly one behind the other, is that the soil does not gather in front of the tool, but passes between the blades, in order to remain behind the tool. If the soil is particularly hard, the handle of the tool must be held in a more horizontal position, which causes the points of the blades only to touch the ground; the instrument then is better apt to penetrate the soil.

In the form of execution of Figures 3 and 4 the support $d'$ made of the same piece, together with the clamp $b$, presents on the inferior face three projecting pieces in a downward direction. On every one of these projecting pieces is fixed a blade $g$. Due to this arrangement, the soil passing between two successive blades does not encounter, as in the first form of execution, the part $d$ in Fig. 1, which constitutes an obstacle for the blade. The soil is therefore able to escape more freely between the two blades. The cutting edge of every one of the blades $g$ (see Fig. 4) has a different shape than the edge of the blades of the first form of execution. This cutting edge is formed by a convex arc 4, the two extremities of which, $4^1$ and $4^2$, are on a different level.

I claim:

Weeding hoe, with several blades of the shape of a ploughshare, labouring an uninterrupted surface, these blades being fixed, obliquely to the handle, on to a common support bent somewhat in the form of the outline of a staircase, so that the soil being dug up, can easily escape between the single blades.

In testimony whereof I hereunto affix my signature.

WILLIAM EICHENBERGER-GIRARDET.